No. 666,361. Patented Jan. 22, 1901.
I. D. SMEAD.
UNDERGROUND CONDUIT.
(Application filed Jan. 29, 1900.)
(No Model.)
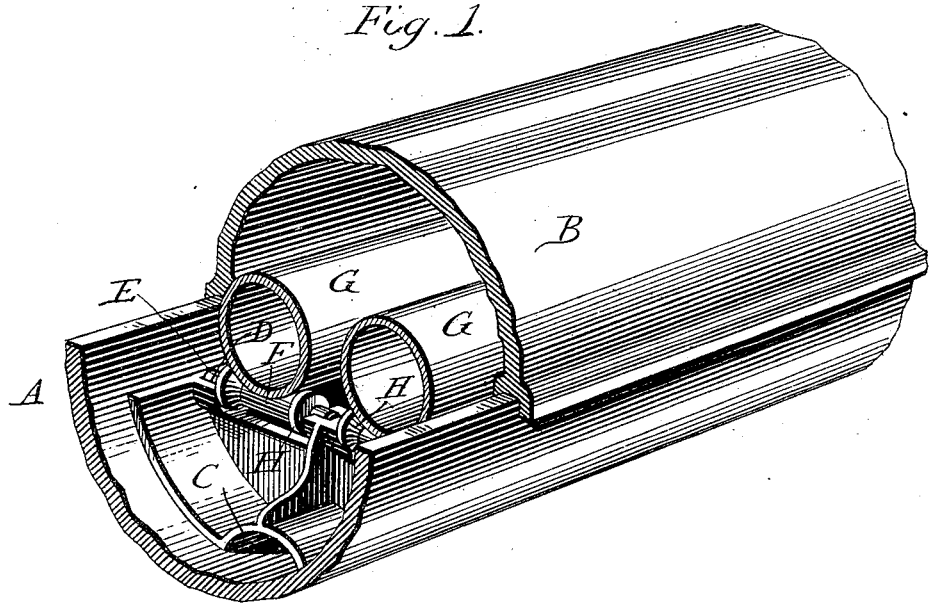
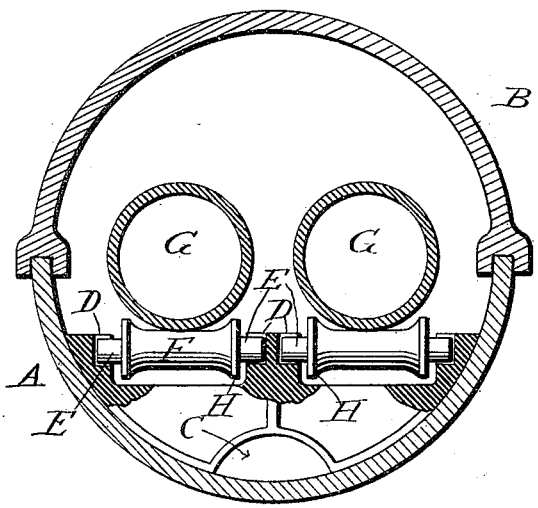
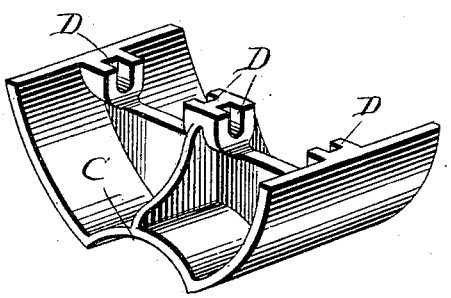
Witnesses
Inventor:
Isaac D. Smead,
by Dodge and Sons,
Attorneys.

UNITED STATES PATENT OFFICE.

ISAAC D. SMEAD, OF TOLEDO, OHIO.

UNDERGROUND CONDUIT.

SPECIFICATION forming part of Letters Patent No. 666,361, dated January 22, 1901.

Application filed January 29, 1900. Serial No. 3,211. (No model.)

*To all whom it may concern:*

Be it known that I, ISAAC D. SMEAD, a citizen of the United States, residing at Toledo, in the county of Lucas and State of Ohio, have invented certain new and useful Improvements in Underground Conduits, of which the following is a specification.

My present invention pertains to improvements in underground conduits designed more especially for connecting and supporting lines of piping for use in connection with a central distributing plant.

The invention is best shown in the accompanying drawings, wherein—

Figure 1 is a perspective view, partially broken away, of the conduit, showing the pipes in place therein; Fig. 2, a cross-sectional view, and Fig. 3 a perspective view, of one of the bed-plates or supports.

The invention has for one object to provide an underground conduit or subway in which the pipes leading from a central heating-station may be placed without difficulty and thoroughly protected. It is manifest that conditions which have to be met in placing heavy piping within a conduit are different from those incident to the drawing in of a flexible cable, wire, or the like, and it is therefore necessary to have some form of support which will maintain the weight of the pipes and yet allow of their being moved lengthwise without difficulty.

Another object of the invention is to provide a construction wherein the radiation of heat from the pipes within the conduit is to a great extent prevented or done away with. Such a construction is shown in the accompanying drawings, wherein—

A is the lower section of a conduit or subway, and B the cover therefor, which is provided with lips adapted and designed to fit over the upper edges of the lower section. In the form shown these sections are made semicylindrical, though it is manifest that their contour may be of any desired shape. Mounted within the conduit thus formed and at stated intervals throughout the length thereof is a bed-plate or support the under face of which is made to correspond with the inner face of the lower section and to rest directly thereagainst. At the lowest point in the under face of said support there is provided a lateral passage or way C, which when the support is in position in the conduit forms a channel or space for the passage of any water along the conduit. In the upper face of said support are formed seats or bearings D, adapted and designed to receive the reduced ends or axles E of rollers F, which are mounted on the base, as is clearly indicated in Figs. 1 and 2. These rollers receive the pipes G, which are shown in place thereon in the figures just referred to. By preference and for the purpose of preventing radiation through the parts to the outer wall of the structure the rollers are made of wood, though I do not desire to restrict myself to this particular material. By supporting the pipes in this manner it will readily be seen that they may be moved along lengthwise without the expenditure of any great amount of power. It will also be noted upon reference to Fig. 2 that as the rollers are made comparatively long the pipes may be moved sidewise thereon without leaving the roller, so that it is not absolutely essential that the pipes should be in alinement throughout. It will also be noted that the rollers are provided with a flange H at each end, which flanges preclude the pipes from passing off the end thereof under ordinary conditions.

Where hot water and steam are passed through the pipes, especially in a long line, there will be more or less contraction and expansion as the temperature varies. By mounting and supporting the pipes on the rollers there is no drag or strain on the pipes as they come and go.

The form of the bed-plate or support may be varied without departing from the spirit of my invention, though the construction shown is light and at the same time strong.

The conduit or subway is put in place by first laying the lowermost section A in the trench. The bed-plates or supports are next placed in said section, the rollers put in position, and the pipes laid thereon. After the pipes are fully coupled up the upper section B of the conduit is put in place, its construction being such, as will be seen upon reference to the drawings, as to prevent all moisture from entering the completed conduit.

It will be noted that the pipes are held in an inclosed space, forming what may be termed a "dead-air chamber," so that there is little or no chance of any heat being radiated.

By reason of the rollers being made of nonconducting material the transmission of any heat from the pipes through the structure to the outer walls thereof is prevented.

Having thus described my invention, what I claim is—

1. The combination of the base A, the bed-plate or support mounted therein provided with a channel or way in its under face; and rollers mounted in the upper face of said bed-plate.

2. The combination with base A, of a bed-plate or support mounted therein; a channel or way intermediate said base and the bed-plate; and rollers mounted in and carried by the upper face of said bed-plate.

3. In combination with base A, a series of supports mounted therein and adapted to receive and support a pipe or pipes; a cover for said lower section, making a water-tight joint therewith; and a drainage-channel extending throughout the length of the conduit thus formed, substantially as shown and described.

In testimony whereof I have signed my name to this specification in the presence of two subscribing witnesses.

ISAAC D. SMEAD.

Witnesses:
PH. L. RAPHAEL,
F. A. KUNEHR.